Patented May 4, 1943

2,318,323

UNITED STATES PATENT OFFICE 2,318,323

MANUFACTURE OF HALOGENATED HYDROCARBONS

Martin Mueller-Cunradi, Ludwigshafen-on-the-Rhine, Adolf Cantzler and Hans Krekeler, Mannheim, Germany, assignors, by mesne assignments, to General Aniline & Film Corporation, New York, N. Y., a corporation of Delaware No Drawing. Application December 8, 1939, Serial No. 308,175. In Germany October 1, 1938

4 Claims. (Cl. 260—660)

The present invention relates to a process for the manufacture of halogen hydrocarbons, more particularly to the production of chlorinated hydrocarbons of the paraffine series.

When preparing halogenated hydrocarbons by the addition of halogen to aliphatic hydrocarbons having olefinic linkages, the reaction is usually carried out in the gas phase. It is necessary to bring the halogen into contact with the olefine in comparatively small reaction vessels, because the resulting heat could otherwise be but insufficiently led away and undesirable by-products would be formed.

It has also been proposed to treat olefinic hydrocarbons in the liquid phase with halogen, for example in a suitable solvent and if desired in the presence of a catalyst, but the initial substances treated in the said manner were hitherto only olefines with at most 3 carbon atoms or the corresponding halogen olefines. These compounds are not very apt to undergo side-reactions, so that special precautions need not be adopted. Any attempt to apply the said liquid phase addition of halogen to olefines or diolefines containing more than three carbon atoms, e. g., from 4 to 5 carbon atoms, however, meets with considerable difficulties, because these olefines and diolefines and their halogenation products are rather easily halogenated by substitution.

We have now found that halogenated hydrocarbons, in particular chlorinated hydrocarbons, may advantageously and without the formation of by-products be prepared by treating mono- or diolefines containing from 4 to 5 carbon atoms with halogen in the liquid phase while carrying out the reaction in the halogenated hydrocarbon formed during the reaction. The halogenated hydrocarbon is passed through the reaction vessel in a cycle, while supplying the olefine or diolefine and halogen to this circulating liquid at a rate that there is always a considerable excess of olefine or diolefine. It is advantageous to work in the absence of a catalyst to avoid contamination of the end product by foreign substances. It is, however, within the scope of our invention to work in the presence of one of the usual halogen transferrers, for example if gas mixtures are halogenated which contain the olefine or diolefine in a low concentration.

The process according to our invention may be carried out with special advantage in tubular vessels or coils through which a certain amount of the halogenated hydrocarbon which is to be prepared, for example dichlorbutane, is led in a cycle by means of a circulatory pump. The liquid is to be circulated at such a speed that the hourly amount of liquid pumped through comes up to a multiple, e. g. more than 10 times, preferably from 50 to 150 times, of the capacity of the vessel. The actual amount of the liquid to be pumped through and the size of the vessel depend on the amount of halogen supplied within the unit of time, which again is a function of the temperature at which the reaction is carried out, i. e. at lower temperatures less halogen may be added than at higher temperatures. The reaction components are added to the liquid to be circulated at a rate that there is always a considerable excess of olefine. How large this excess is chosen again depends on the reaction temperature. If the reaction be carried through at about 0 to 10° C., about twice the amount of olefine is sufficient. When the reaction temperature is raised to say 20 to 50° C. then higher excesses of olefine or diolefine are used which may be easily determined by a test.

Generally speaking, the reaction is carried out at temperatures which may be maintained with the aid of water as a cooling medium, i. e. at between about 10 and 50° C. When working at temperatures as low as 0° C. and lower a brine may be used as the cooling medium.

The halogen is introduced into the circulating liquid, either in the liquid or in the gaseous state and as finely dispersed as possible, for example through nozzles having a great number of openings or through filter candles of porous ceramic material. The reaction mixture is always to be kept in the liquid state. Working under increased pressure may therefore be necessary in some cases.

The halogenated hydrocarbons formed are recovered by withdrawing part of the liquid from the cycle at a point where the halogen has been completely used up and removing from the said part of the liquid the non-converted olefine, for example by distillation. In this way the final product is obtained substantially free from by-products and solvents. The invention, therefore, permits of preparing halogenated hydrocarbons, for example of dichlorbutane, dichlorbutene or tetrachlorbutane in one step, thereby avoiding further purifying steps. Chlorine transferrers, when used, may easily be removed by subjecting the final product to a washing or distillation treatment.

Suitable initial materials are in particular normal-butylene and isobutylene, also 1,3-butadiene and the corresponding hydrocarbons containing 5 carbon atoms. The process offers special advantages in the chlorination of isobutylene which has a very marked tendency towards the formation of substitution products. When chlorinating isobutylene according to our present invention, there is scarcely any formation of hydrogen chloride, the chlorine being added completely onto the double linkage. Instead of pure olefines, mixtures containing olefines may also be used, for example mixtures of butylene and butane. From mixtures of the said kind, the olefine is converted into dihalogen hydrocarbon without the paraffin hydrocarbon being in the least affected, provided that the olefinic portion is in excess of the chlorine introduced. In this case the final product may also be recovered from the circulation liquid in a most simple manner.

The following examples serve to illustrate how the invention may be carried out in practice, but the invention is not restricted to the examples.

*Example 1*

23 kilograms of a liquid which consists of equal weights of normal-dichlorbutane and normal-butylene are pumped through a tubular cooler in a closed cycle. The contents of the tubular cooler are recycled about 60 times an hour. The apparatus is under a pressure of 2 atmospheres. During the reaction the liquid is cooled to such an extent that its temperature does not rise above 10° C. Into the circulation liquid are now introduced at separate points, either before or behind the circulation pump, 13 kilograms of normal-butylene and 5 kilograms of chlorine per hour. At another point of the cycle 18 kilograms of liquid are withdrawn per hour, distilled at 50° C., whereby 9 kilograms of normal-butylene are obtained. These are again led to the circulation liquid. The residue contains 98.2 per cent of 2.3-normal-dichlorbutane.

*Example 2*

A mixture of 12.2 kilograms of 1.2-dichlorbutene-2 and 7.3 kilograms of 1.3-butadiene are pumped through a water-cooled tubular cooler (temperature of the water 20° C.), being under a pressure of 5 atmospheres, at a rate that the amount of liquid present in the system is recycled about 80 times an hour. 12.7 kilograms of 1.3-butadiene and 7.1 kilograms of chlorine are hourly introduced at separate points of the cooler. Part of the circulation liquid is branched off continuously, released from pressure through a valve and any non-converted butadiene removed therefrom by distillation. A mixture of 1.2- and 1.4-dichlorbutene-2 is thus obtained in a yield of 75.2 per cent.

*Example 3*

The reaction vessel used is a combination of two vertically arranged tubular coolers with a capacity of 200 liters each, which are united by pipe lines to a closed cycle. A circulation pump with an hourly throughput of about 50 cubic meters is intercalated within the line connecting the lower ends of the two coolers. Both the lower and the upper connecting line are further provided with a nozzle for the supply of chlorine and short tubes for the supply of butylene.

The system is filled with a mixture of 100 kilograms of 2.3-normal-dichlorbutane and 60 kilograms of normal-butylene, placed under a pressure of 4 atmospheres and the pump then put in operation. They are then hourly pressed in through the nozzles 142 kilograms of chlorine, while 264 kilograms of normal-butylene are hourly pressed in through the short tubes. The temperature of the cooler is so controlled that the circulating liquid lies about 40° C. at the point where the chlorine enters. From the coolers there are hourly withdrawn 406 kilograms of a liquid which consists of a mixture of about 254 kilograms of 2.3-normal-dichlorbutane, 1.152 kilograms of normal-butylene and small proportions of higher chlorinated products in addition to some hydrogen chloride. This mixture continuously passes into a distilling column being under a pressure of 3.5 atmospheres and heated to 80°, where the bulk of butylene and hydrogen chloride is expelled. The residue which still contains about 5 to 10 per cent. of butylene is continuously passed to a second distilling vessel in which the last traces of butylene are expelled at a temperature of about 100° C. The chlorination product so obtained consists of more than 95 per cent of 2.3-dichlorbutane which is free of butylene and hydrogen chloride. The butylene expelled is freed from hydrogen chloride and returned into the process.

What we claim is:

1. A process for producing chlorinated hydrocarbons without substantial formation of any chlorine substitution by-products by treating an aliphatic hydrocarbon containing from 4 to 5 carbon atoms and at least one olefinic linkage with chlorine, which comprises introducing chlorine and an excess of the aliphatic hydrocarbon into the liquid chlorinated hydrocarbon formed as a result of the chlorination, the reaction mixture being circulated through the reaction vessel so that a multiple of the amount of liquid present in the reaction vessel is circulated per hour, the temperature of the reaction being controlled not to exceed 50° C. and the reaction mixture being maintained in the liquid phase throughout the treatment.

2. A process as in claim 1 in which the amount of the reaction mixture circulated per hour is from 50 to 150 times the capacity of the reaction vessel.

3. A process for producing normal dichlorobutane without substantial formation of any chlorine substitution by-products by treating normal butylene with chlorine, which comprises introducing chlorine and an excess of normal butylene into liquid normal dichlorobutane, the reaction mixture being circulated through the reaction vessel so that a multiple of the amount of liquid present in the reaction vessel is circulated per hour, the temperature of reaction being controlled not to exceed 50° C. and the reaction mixture being maintained in the liquid phase throughout the treatment.

4. A process as in claim 3 in which the temperature of reaction does not exceed 10° C. and in which the amount of the reaction mixture circulated per hour is 60 times the content of the reaction vessel.

MARTIN MUELLER-CUNRADI.
ADOLF CANTZLER.
HANS KREKELER.